April 15, 1969 H. A. BERNARD ET AL 3,438,452
CORE SAMPLING
Filed Dec. 18, 1967
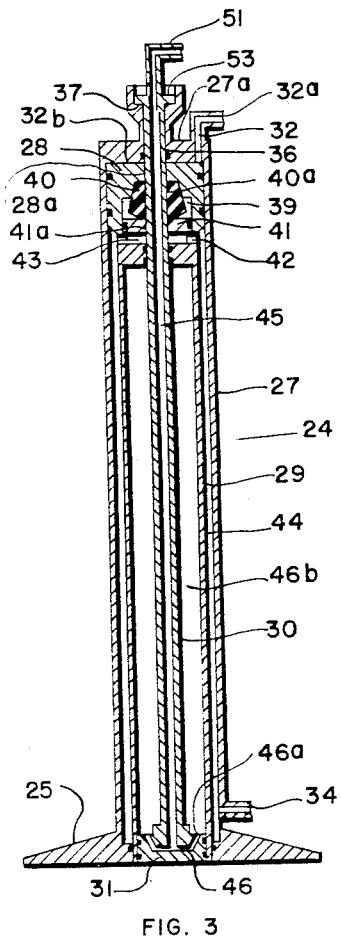
FIG. 3
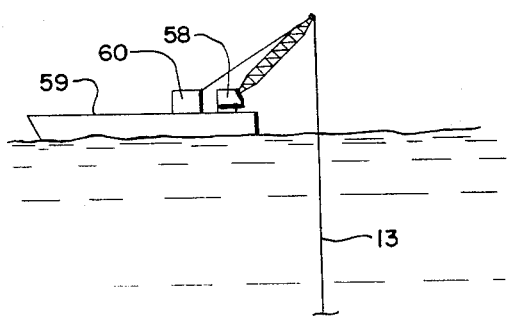
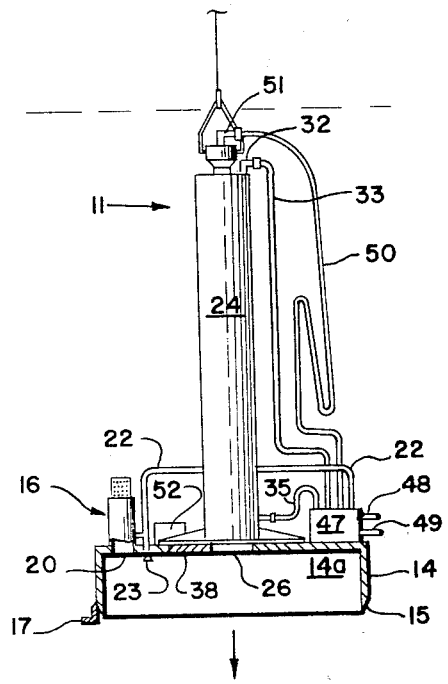
FIG. 1
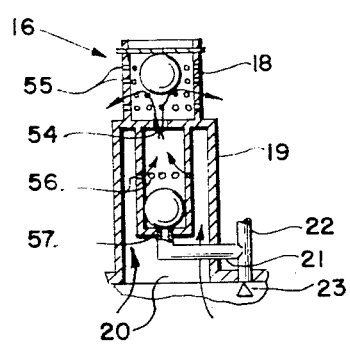
FIG. 2
INVENTORS:
H. A. BERNARD
E. E. DAIGLE
J. C. RICHARDSON
BY *Louis J. Bovasso*
THEIR ATTORNEY

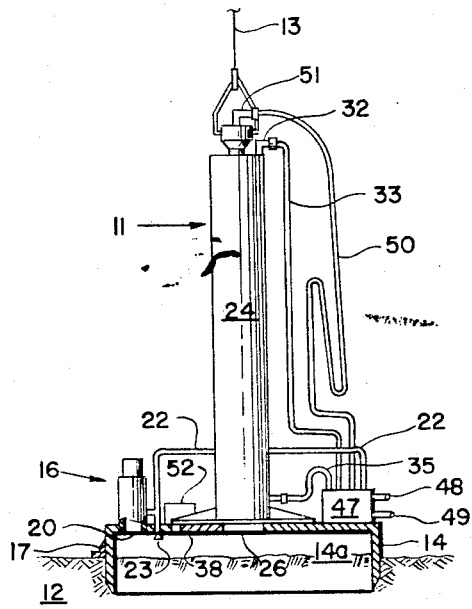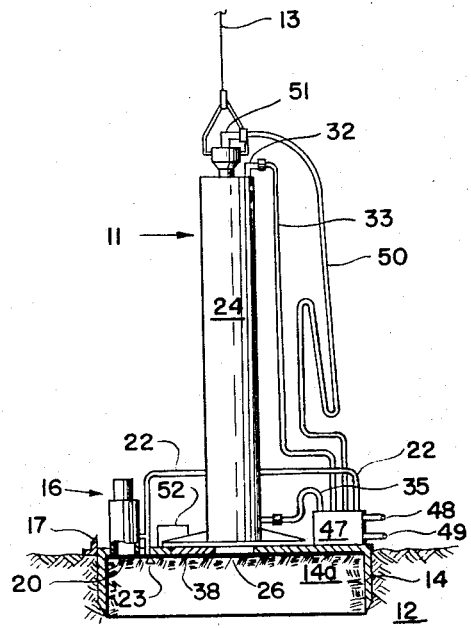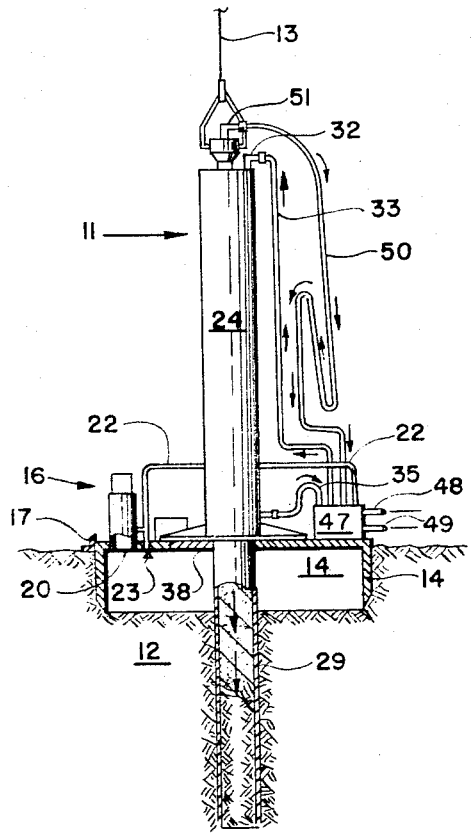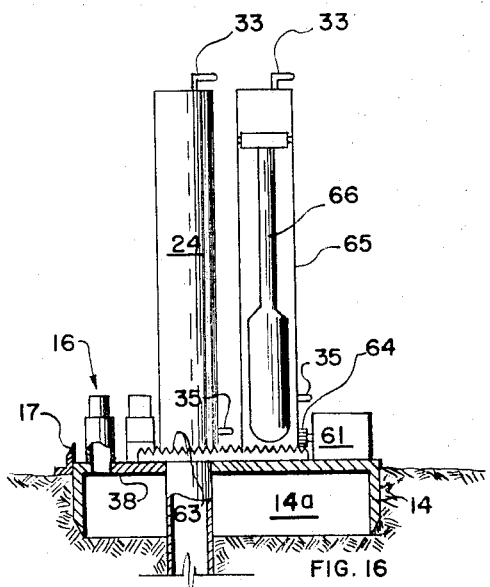
FIG. 4
FIG. 5
FIG. 6
FIG. 16
INVENTORS:
H. A. BERNARD
E. E. DAIGLE
J. C. RICHARDSON
BY: *Louis J. Bovasso*
THEIR ATTORNEY

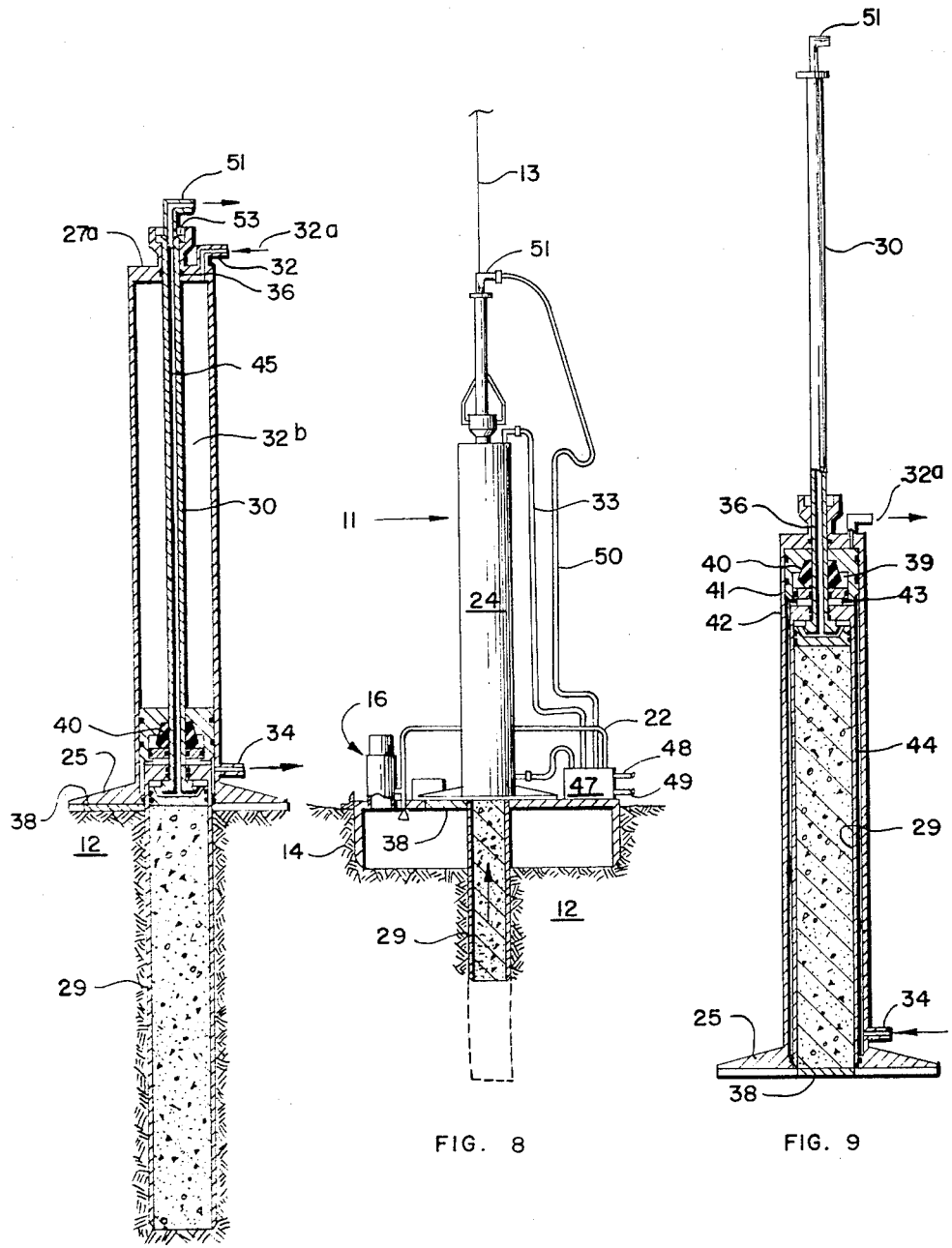

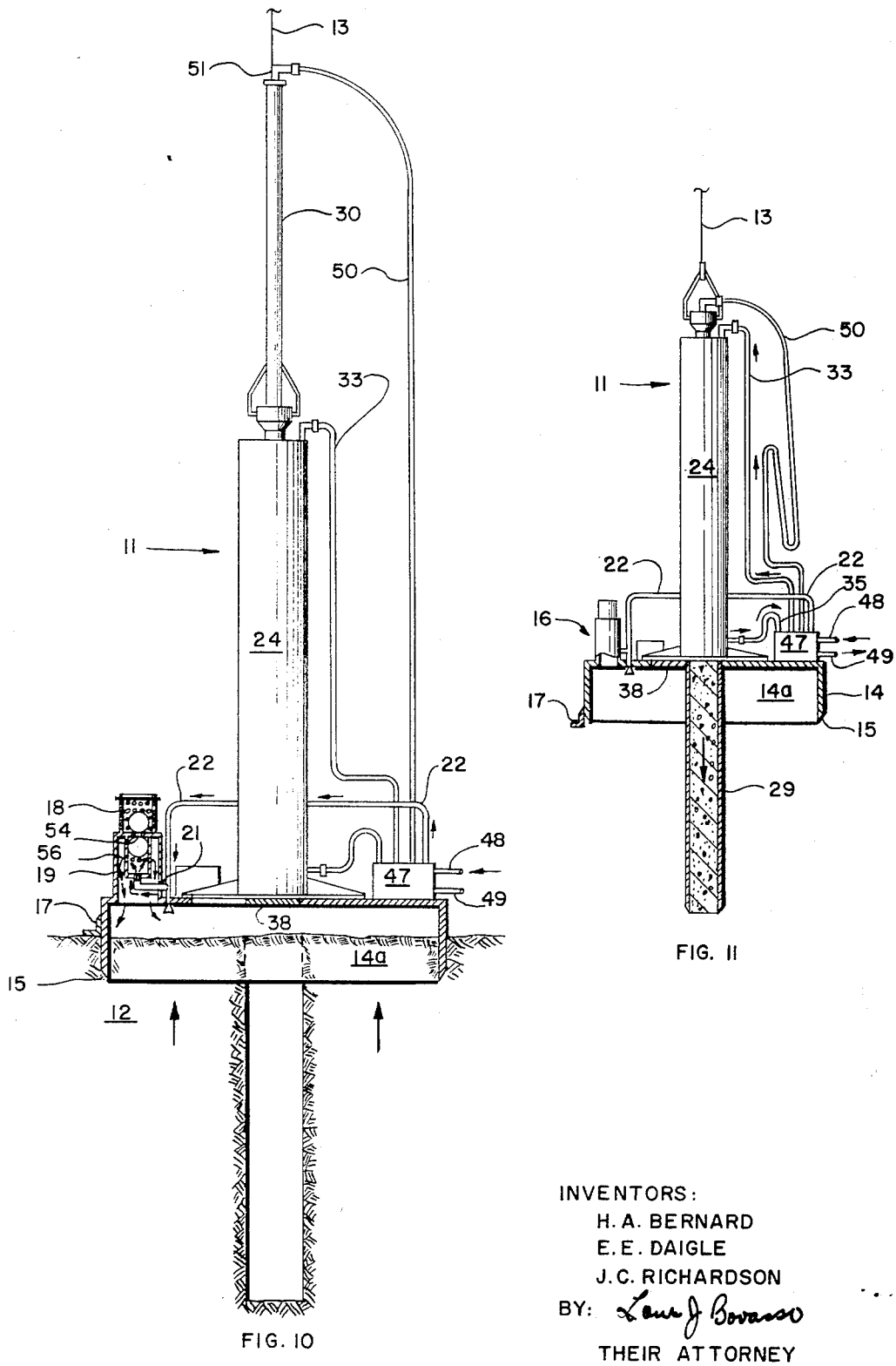

April 15, 1969 H. A. BERNARD ET AL 3,438,452
CORE SAMPLING
Filed Dec. 18, 1967 Sheet 5 of 5
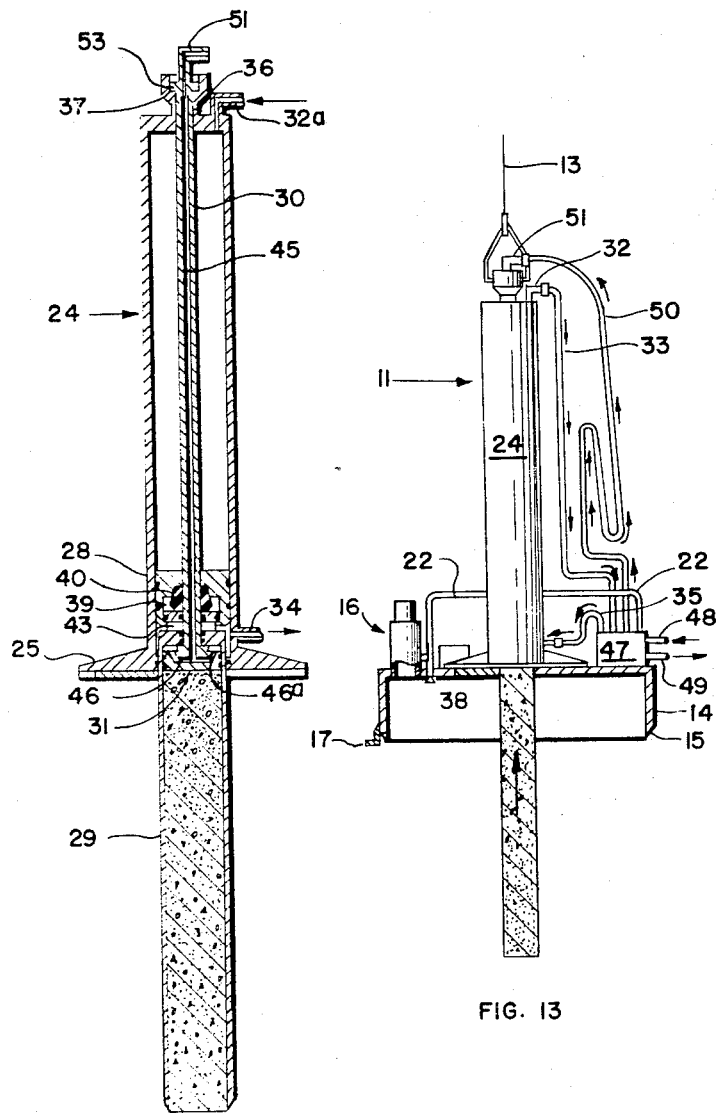
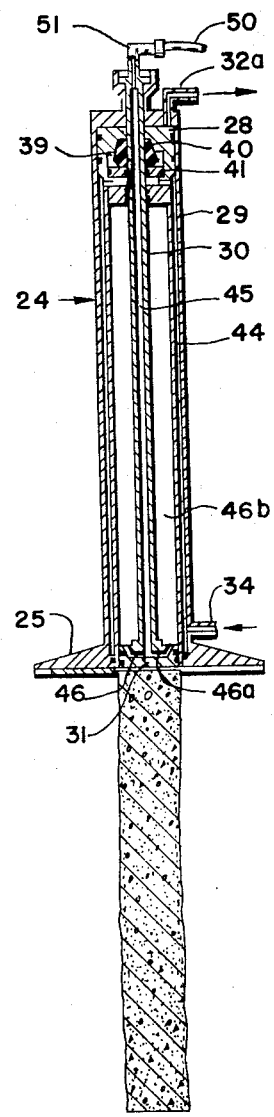
FIG. 12    FIG. 13    FIG. 14
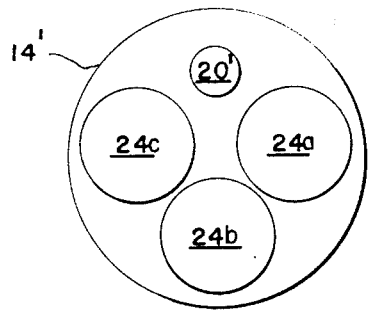
FIG. 15
INVENTORS:
H. A. BERNARD
E. E. DAIGLE
J. C. RICHARDSON
BY Louis J Bovasso
THEIR ATTORNEY United States Patent Office 3,438,452
Patented Apr. 15, 1969

3,438,452
CORE SAMPLING
Hugh A. Bernard, Edwin E. Daigle, and Jacob C. Richardson, Houston, Tex., assignors to Shell Oil Company, New York, N.Y., a corporation of Delaware
Filed Dec. 18, 1967, Ser. No. 691,568
Int. Cl. E21b 7/12, 1/00, 49/00
U.S. Cl. 175—6       10 Claims

ABSTRACT OF THE DISCLOSURE

Method and apparatus for taking a core sample from a liquid permeated sedimentary earth formation. Core sampling apparatus is anchored to the formation surface and coring means is thrust into the formation. A core sample is retained by the coring means when the coring means is retracted from the earth formation.

BACKGROUND OF THE INVENTION

Field of the invention

The present invention is directed to means for obtaining a core sample from earth formations and is particularly related to the rapid obtaining of an uncontaminated, undisturbed and oriented core sample from the bottom of water-covered areas such as the ocean floor.

Description of the prior art

It is of prime importance that earth samples at the bottom of oceans be obtained for study without disturbing their sequence. These samples contain a record of the sedimentological, biological and chemical changes which have taken place throughout the period of deposition.

A number of devices for obtaining corings of earth samples have been proposed; however, all of these suffer from some disadvantage when applied to limnological work. Some devices require heavy weights to drive them into the sediment, thus necessitating the use of heavy lifting tackle and relatively large vessels or floating platforms. One proposed device eliminated some of these difficulties but was found to operate with great difficulty in water depths greater than 65 feet because such device utilized a rod pushed into the sediment by hand. The flexibility of the rod was a serious limitation even when the rod was stiffened by a casing pipe.

It is usual practice when foundation testing and when drilling for water, oil, natural gas, sulfur or other minerals to take samples of the material of a particular formation through which a drill is passing and many core-obtaining devices exist for this purpose. Most of these devices are arranged to be rotated by drilling apparatus at the surface and, in effect drill an annular slot in the formation so that a solid cylinder of the formation is obtained. When sufficient material is thus drilled out, the drill and the central core, are withdrawn to the surface and the core is removed. This usual way of taking cores is time-consuming and consequently expensive.

Besides the taking of cores in wells being drilled for production, coreas are often separately taken during exploration studies to obtain information as to the nature of the sedimentary beds being investigated. Such exploratory drilling is carried out on dry land and on the floor of the ocean or other water-covered areas from floating or fixed platforms using portable equipment.

SUMMARY OF THE INVENTION

It is an object of this invention to take earth samples more expeditiously by providing a coring technique utilizing a tool which is forced into an earth formation by hydraulic pressure.

It is a further object to obtain undisturbed cores of most unconsolidated sediment types from the bottom of water-covered areas.

It is another object to obtain more than one core sample during a single operation and to enable recording instruments to be readily implanted in the subbottom sediment on the ocean floor.

It is still another object of this invention to obtain more expeditiously core samples in unlimited water depths and on ocean bottoms affected by relatively large waves and strong currents.

The teachings of this invention are carried out by positioning core cutting means on the surface of the earth formation desired to be cored. The core cutting means includes apparatus for pressing the cutting means into engagement with the formation and for extending a core-barrel into the formation and withdraw a sample therefrom. The apparatus further includes means for withdrawing the core-barrel and extruding the coring sample carried therein.

This invention is most useful in obtaining cores of soft or stiff clay and silt, loose or hard packed shell, gravel or sand.

BRIEF DESCRIPTION OF THE DRAWING

FIGURE 1 is a vertical sectional view of a preferred embodiment of the invention;

FIGURES 2 and 3 are vertical sectional views of portions of FIGURE 1;

FIGURES 4 and 5 are vertical sectional views illustrating steps in anchoring the preferred embodiment of the invention;

FIGURES 6 and 7 are vertical sectional views illustrating steps in inserting the core barrel of the preferred embodiment of the invention into an earth formation;

FIGURES 8 and 9 are vertical section views illustrating steps in retracting the core barrel of the preferred embodiment of the invention from the earth formation;

FIGURE 10 is a vertical sectional view illustrating the step of releasing the preferred embodiment of the invention from the anchored position of FIGURE 5;

FIGURES 11 through 14 are vertical sectional views illustrating the steps of extruding a core sample from the core barrel of FIGURES 8 and 9;

FIGURE 15 is an end plan view of modification of the invention; and

FIGURE 16 is a vertical sectional view of a further modification of the invention.

DESCRIPTION OF THE PREFERRED EMBODIMENT

Referring to FIGURE 1, the self-anchoring core sampling apparatus 11 is illustrated as being lowered to the ocean bottom 12 by means of a conductor guide line 13. Apparatus 11 includes an anchoring unit 14 in the form of a relatively large cylindrical chamber having its lower end open towards the ocean bottom 12. The lowermost run of unit 14 comprises a cutting edge 15 adapted to dig into ocean bottom 12 as will be explained further hereinbelow.

Unit 14 also includes an anchoring valve system 16 (FIGURE 2) located on its top side adjacent the periphery thereof. Only one anchoring valve system is shown for convenience of illustration; however, it is to be understood that more than one may be provided depending on the usage of the apparatus in its intended environment. A foot switch 17 is located on the outside lower edge of unit 14. Switch 17 is operatively connected by suitable means to a surface control unit 60. Necessary conductor cables (not shown), for actuating switch 17 and any other elements of apparatus 11, may extend through or along conductor guide line 13 to the surface control unit 60.

Each valve system 16 (FIGURE 2) includes an upper ball valve 18 and a lower ball valve 19. A port 20 connects the valve system 16 with the chamber 14a of unit 14 as can best be seen in FIGURE 1. A weighing anchor conduit 21 connects lower valve 19 with an anchor conduit 22. A check valve 23 operatively connects anchor conduit 22 with the chamber 14a of unit 14.

A coring tube assembly 24 is disposed at the center of the upper surface of unit 14. As best seen in FIGURE 3, assembly 24 is attached by means of flange 25 to the upper surface of unit 14. Assembly 24 is located over and in communication with a coring tube port 26 (FIGURE 1) centrally located on the top of anchoring unit 14.

Coring tube assembly 24 (FIGURE 3) comprises a cylindrical outer casing 27, a driving piston 28 having an attached coring barrel or tube 29, and a slidably mounted shaft 30 having a coring piston 31 attached thereto. Cylindrical casing 27 contains therein the pistons 28 and 31, shaft 30 and coring tube 29. A passageway 32, leading to a port 32a, located on the upper end 27a of casing 27, connects the space 32b in the upper end of casing 27 above driving piston 28 with a tube insert line 33 (FIGURE 1). A second port 34 (FIGURE 3) connects the space 44 in the lower end of casing 27, below driving piston 28 and between the outer wall of coring tube 29 and the inner wall of casing 27, with a tube retractor conduit 35 (see FIGURE 1). Piston shaft 30 slides through an axial passageway 36 located at the upper end 27a of casing 27. A shoulder 37 is located at the upper end of passageway 36 for reasons to be discussed further hereinbelow.

A preferably solenoid-operated coring holder gate 38 is contained within the flange 25 (shown in its retracted position in FIGURE 1) and is laterally slidable therein by means well known in the art. Driving piston 28 is slidable within cylindrical casing 27 and its lower end is attached to the coring tube 29. The piston 28 contains therein a vertical passageway 28a through which shaft 30 is slidable therein; piston 28 also contains an axial inner cylindrical collet piston portion 39 in which is disposed a rubber flex collet 40 above a collet piston 41 as can be seen in FIGURE 3. Both collet 40 and piston 41 have axial passageways 40a and 41a, respectively, through which shaft 30 slides.

Side ports 42 are disposed adjacent the lower end of driving piston 28; these ports connect the space 43 in the lower point of the collet piston 41 with the space 44 in the lower end of casing 27.

Coring piston 31 and its attached shaft 30 are slidable within coring tube assembly 24. Shaft 30 is slidable within the axial passageways through the driving piston 28, collet piston 41, rubber flex collet 40, and the passageway 36 through the upper end of casing 27. The space 46b within the upper portion of coring tube 29 and above coring piston 31 is connected to the coring extruder conduit 35 through passageways 45 and 46 in the coring piston 31 and attached shaft 30.

The apparatus 11 is preferably actuated by means of hydraulic lines (not shown) connecting the apparatus 11 with a hydraulic power and solenoid valve unit 47 situated on the upper surface of anchoring unit 14 (FIGURE 1). Unit 47 is preferably powered by an electric pump (not shown) and activated by means of surface control unit 60 which may be attached to a floating platform, a vessel 59, etc. Of course, any prime mover means, mechanical or electrical, hydraulic or pneumatic, may be used to power unit 14. Also, various control lines may pass through guide line 13 to the surface control unit as is well known in the art.

In order to anchor the apparatus 11 in very permeable loose sand and gravel, it may be desirable to install a system for automatic maintenance of differential pressure between the outside and the inside of the chamber of unit 14.

Locally available water is preferably used for the hydraulic fluid for power unit 47. The pressure and volume used in any one operation is preferably metered at the pump by conventional means.

The valves (not shown) in power unit 47 are preferably solenoid-operated and direct the flow of the hydraulic fluid through the intake conduit 48, the exhaust conduit 49, the anchor conduit 22, the tube insert conduit 33, the tube retractor conduit 35, and the coring extruder conduit 50 coupled to a port 51 on the upper portion of assembly 24 and connecting passageway 45 to extruder conduit 50.

An altitude indicator 52 is preferably mounted on the upper surface of anchoring unit 14 for determining the orientation of the apparatus 11. Indicator 52 is preferably a vertical altitude indicator.

Shaft 30 is provided with a stop flange 53 on its upper end to limit downward movement of shaft 30 when it abuts against shoulder 37.

Referring once again to FIGURE 2, valve system 16 includes a valve port 54 common to the upper anchoring valve 18 and lower anchoring valve 19. Escape ports 55 are provided in the wall of upper anchoring valve 18 and escape ports 56 are provided in the wall of lower anchoring valve 19. Lower anchoring valve 19 also includes a basal valve port 57 in communication with passageway 21, the operation of which will be described further hereinbelow.

In operation, the apparatus 11 is preferably lowered and retrieved by means of a hoist cable or wire line 13 coupled to a winch 58 mounted on a floating vessel 59. Of course, instead of vessel 59, the apparatus 11 could be lowered from a submersible vehicle. During its descent, buoyant air or water which may be trapped in the chamber 14a of anchoring unit 14 is released through the upper anchoring valve 18 by actuating power unit 47 through surface control unit 60 as is well known in the art. Thus, if necessary, the hydraulic power unit 47 may be operated to remove and replace buoyant or compressible fluid from anchoring unit 14.

Upon being lowered in the direction of the arrow in FIGURE 1 until apparatus 11 touches the ocean bottom 12, foot switch 17 closes a circuit (not shown) coupled to control unit 60 and sends a signal to the operator, who, at his discretion after determining the altitude of the apparatus 11 by reference to indicator 52, may relocate or reorient the instrument.

The appartaus 11 is anchored to the ocean bottom 12 by removing fluid from the chamber 14a within unit 14 as can be seen in FIGURES 4 and 5. When the apparatus 11 is found to be in satisfactory position, the pump of power unit 47 is actuated to reduce the pressure within chamber 14a by directing the flow of the fluid from the chamber 14a through the check valve 23 of anchoring valve system 16, the anchoring conduit 22, and out through the exhaust conduit 49 as indicated by the direction of the arrow in FIGURE 4. The ball valves of valve system 16 close and prevent the flow of outside water in chamber 14a; hydrostatic pressure, acting on the outside of chamber 14a, drives the cutting edge 15 into the ocean bottom 12 as can be seen in FIGURE 4. The relative movement of the foot switch 17 on the side of chamber 14a informs the operator if this action is carried out and when the entire inside surface of the chamber 14a comes into full contact with the sediment of ocean bottom 12 as shown in FIGURE 5.

Any force tending to lift the chamber 14a automatically lowers the pressure along the water-wet interface between the chamber 14a and the sediment; thus, the higher differential pressure acting on the outside tends to hold the apparatus 11 firmly in position. Full contact of the inside top of chamber 14a with the bottom sediment, however, is not necessary to anchor the chamber 14a. This contact is required only to prevent disturbance of the top of the core sample when part of the water column is sampled about the water-sediment interface as will be discussed hereinbelow. Agitation of this water disturbs the upper portion of the core sample during the coring extrusion procedure.

After the apparatus 11 is anchored, the coring tube 29 is forced into the sediment by directing fluid through the tube insert conduit 33 into port 32a and against the driving piston 28. This action displaces the fluid within the coring tube 29, i.e., between the driving piston 28 and the coring piston 31, through passageways 46 to 46a in the coring piston 31, the slidably mounted shaft 30 and the coring extruder conduit 50. The arrows in FIGURE 6 show the direction of movement of coring tube 29 and the flow of fluid through conduits 35, 48, 49, 50, and 33. Fluid in the space 24 is thus displaced through the tube retractor conduit 35. Because the coring piston 31 is held immobile and in contact with the top of the sediment as the tube 29 is forced downwards around the coring piston 31 and into the sediment, the fluid pressure remains low at the interface between the coring piston 31 and the sediment.

Any upwards force exerted on the coring tube 29 after it is inserted into the sediment as described hereinabove, transmits the lower pressures at the interface between the coring piston 31 and the sediment downward through the sediment to the bottom of the tube 29. The core breaks off at the end of tube 29; the higher pressure outside of tube 29 and also skin friction hold the core sample of the sediment within tube 29 as it is extracted. The final insertion position of coring tube 29 is shown in FIGURE 7 wherein the arrows indicate the direction of fluid flow. Core holder gate 38, normally in a closed position, is shown retracted to the left in FIGURES 6 and 7 to permit coring tube 29 to enter the ocean bottom 12.

Following insertion of the tube 29 into the sediment, tube 29 containing the core sample is retracted within the casing 27 by pumping fluid through the tube retractor conduit 35, port 34, space 44 and into the lower part of cylindrical portion 39 of collet piston 41 as can be seen in FIGURE 9. This fluid forces the collet piston 41 upwards against the rubber reflex collet 40 which compresses and grips the slidably mounted shaft 30. Continued flow of fluid through this system in the direction of the arrows in FIGURES 8 and 9 exerts an upward pressure against driving piston 28 causing it and the coring tube 29 to retract into the cylindrical casing 27 as the shaft 30 slides upward through the passageway 36 in the upper part of casing 27. This action displaces the fluid above driving piston 28 through the tube intake conduit 48 and exhaust conduit 49 Thus, coring tube 29 moves from the dotted line position of FIGURE 8 to the solid line position, then to the final position of FIGURE 9 wherein shaft 30 is extended above the casing 27. After the tube 29 is retracted to the position of FIGURE 9, the coring holder gate 38, carried by flange 25, is closed in order to secure the core sample in the tube 29 during the retrieval procedure to be described hereinbelow.

In order to retrieve the apparatus 11 from the ocean bottom, 12, the anchoring chamber 14a is weighed by forcing hydraulic fluid through the anchoring line 22 and valve system 16 and into the chamber 14a as can be seen in FIGURE 10. The arrows indicate the direction of movement of apparatus 11 and the flow of fluid.

Pressure within the anchoring conduit 22 closes the check valve 23 connecting one branch of line 22 with the chamber 14a and forces the fluid to flow through the weighing anchor conduit 21 and into the base of the lower anchoring valve 19. This pressure lifts the ball off its lower seat, past the side ports 56 in the lower valve 19, and forces it upwards against the middle valve port 54. By this action, escape of the hydraulic fluid through the upper ball valve 18 is prevented and the fluid passes through the side ports 56 in the lower valve 19 and into the chamber 14a. Therefore, the chamber 14a is forced to withdraw from the sediment in the ocean bottom 12. The return of the foot switch 17 to its former position at the cutting edge 15 informs the operator of this action and of the complete withdrawal of the edge 15.

The apparatus 11 is then returned to surface vessel 59 by means of guide line 13. The core sample is extruded and the apparatus 11 readied for taking the next core as illustrated in FIGURES 11 through 13. The coring holder gate 38 is opened as shown in FIGURE 11 and fluid is forced against the upper end of driving piston 28 through the tube insert conduit 33. The arrows show the direction of movement of parts and flow of fluid. The initial position of the elements of assembly 24 is similar to that shown in FIGURE 9. By this action, the piston 28 and the attached coring tube 29 containing the coring piston 31 and core sample move to an extended position below the casing 27 as seen in FIGURE 12, which is limited by the seating of the flange 53 of shaft 30 on the shoulder 37 within the passageway 36 at the upper end 27a of casing 27, the downward stroke of the driving piston 28 displaces the fluid in the space 44 out through the extruder conduit 50.

Finally, as illustrated in FIGURES 13 and 14, the driving piston 28 and attached coring tube 29 is forced to move to their uppermost positions within casing 27, as the coring piston 31 is held by pressured fluid at the lower end of the coring tube assembly 24.

In order to effect this action, fluid is pumped into the space 46b between the driving piston 28 and the coring piston 31 through the extruder conduit 50 and the port 51, connecting passageways 45, 46, 46a, space 43 within the slidable shaft 30, and coring piston 31. Fluid within the upper part of casing 27 and above driving piston 28 is displaced out through the port 32a to insert conduit 33. The arrows in FIGURES 13 and 14 show the direction of movement of parts and the flow of fluid. The upward stroke of the driving piston 28 lowers the pressure in the connected space 44, i.e., the space between the outer wall of coring tube 29 and the inner wall of casing 27, and the lower part of the cylindrical portion 39 of collet piston 41. Thus, the rubber flex collet 40 expands and loosens its grip on the slidably mounted shaft 30 and fluid will flow into this enlarging space through the tube retractor conduit 35. During this action, the coring piston 31 acts as a ram and drives the core sample outwardly as shown in FIGURE 14 where it may be deposited into a suitable container.

By placing a plurality of coring tube assemblies on a sliding platform, or in a cluster on a revolving platform, similar to that of a Gatling gun, more than one core sample may be obtained during a single trip from a surface vessel by the means of a wire guide line, or from a submersible to which the assembly may be attached.

This modification is illustrated in FIGURE 15 wherein an end plan view of anchoring unit 14' shows a plurality of coring tube assemblies 24a, 24b, and 24c. Port 20' corresponds to port 20 in FIGURE 1. The corresponding coring holder gates have been omitted for convenience of illustration. Also, it is to be understood that suitable connection is provided between assemblies 24a, 24b, and 24c and operating equipment (similar to that discussed previously in the embodiment of FIGURES 1 through 14) on the upper portion of anchoring unit 14'; thus, assemblies 24a, 24b, and 24c may be actuated sequentially or simultaneously to extract core samples from an earth formation.

Detachable recording instruments may be placed within modified core assemblies and implated in cored holes immediately after taking the sample. Thus, travel time in taking more than one core sample and in implanting instruments in deep water, especially by submersibles, may be reduced considerably.

When taking coring samples in ice, the penetrating edge 15 of chamber 14a may be pressured by the removal of air or fluid from chamber 14a until penetration occurs due to the pressure-induced deformation of the ice. Thus, the operation of the self-anchoring apparatus 11 is made possible by static pressure acting to hold together two materials inside a metal chamber and a sediment surface having a common, low pressured, water-wet interface; and any force which acts to pull apart two materials having a common, water-wet interface is opposed by static pressure which acts within the surrounding masses.

The sampling apparatus of the instant invention is capable of obtaining undisturbed oriented cores, up to ten feet long and three inches in diameter, from most water-permeated unconsolidated sediments from land, or the bottom of water covered areas. The apparatus can be operated in unlimited water depths and on most sea bottoms including those affected by relatively large waves and strong currents.

As discussed previously, the apparatus can be easily modified to obtain more than one core, to implant recording instruments in core holes, and to operate free of vessels by means of electronically controlled systems. This is illustrated in FIGURE 16 wherein an arrangement similar to FIGURE 15 is depicted. Like numerals refer to like parts of FIGURES 1 through 14. A positioning motor 61 is disposed on the upper surface of anchoring unit 14. The coring tube assembly 24 is mounted on a rotary table 62 having gearing means 63 on the periphery of its upper surface adapted to mate with like gears 64 coupled to motor 61. A tube assembly 65, similar to coring tube assembly 24, is also mounted on the upper surface of rotary table 62 and disposed to align with coring tube port 26 when table 62 is rotated. A recording instrument, such as a temperature proble 66, is disposed within tube assembly 65. Operating elements, similar to those shown in FIGURES 1 through 14, are coupled to tube assemblies 24 and 65 for operation thereof. For convenience of illustration, these elements have been omitted in FIGURE 16.

In operation, motor 61 is rotated so as to rotate assembly 24 off of alignment with port 26 and the instrument tube assembly 65 into alignment therewith after a core has been removed. The instrument 66 is then driven into the hole made by assembly 24 in the manner the coring tube 29 was driven into the ocean bottom 12. The instrument 66 may be a radio telemetering instrument with a floating antenna that is later released by a timer (not shown).

Various other modifications may be made, as will occur to those skilled in the art, and the exclusive use of all modifications as come within the scope of the appended claims is contemplated.

We claim as our invention:

1. A method for extracting a core sample from a liquid permeated sedimentary earth formation utilizing a core-cutting means, said method comprising the steps of:
   positioning said core-cutting means on the surface of the formation to be cored;
   pressing said core-cutting means into anchoring engagement with said formation surface;
   forceably extending a core portion of said core-cutting means into said formation;
   forceably removing said coring portion from the formation so as to withdraw a core sample of said formation therewith; and
   releasing said core-cutting means from anchoring engagement with said formation surface.

2. The method of claim 1 including the step of extracting the core sample from said coring portion.

3. The method of claim 1 wherein the step of pressing said core-cutting means into anchoring engagement includes evacuating at least a portion of the environmental fluid disposed between said core-cutting means and said formation surface thereby creating a low fluid pressure zone between said formation surface and the environmental fluid surrounding said core-cutting means.

4. The method of claim 3 wherein the step of releasing said core-cutting means from anchoring engagement includes replacing said evacuated environmental fluid between said core-cutting means and said formation surface.

5. Apparatus for taking a core sample from a liquid permeated sedimentary earth formation comprising:
   housing means adapted to be positioned on the surface of said earth formation;
   anchoring means operatively engaging said housing means for anchoring said housing means to said surface;
   core-cutting means carried by said housing means adapted to remove a core sample from the surface of said earth formation;
   extensible means cooperating with said core-cutting means adapted to extend said core-cutting means into said formation; and
   retraction means cooperating with said core-cutting means for retracting said core-cutting means from said earth formation.

6. The apparatus of claim 5 wherein said anchoring means includes a chamber formed within said housing means, said chamber having an open end and being substantially fluid-tight when said open end is in abutting relation with said surface,
   a cutting edge extending peripherally of said chamber and disposed so as to engage the surface of said earth formation; and
   hydraulic means operatively engaging said chamber for evacuating at least a portion of the environmental fluid disposed within said chamber and above said earth formation surface thereby extending the cutting edge into said formation.

7. The apparatus of claim 5 wherein said housing means includes bore means adapted to receive therein said core-cutting means, said core-cutting means comprising a tubular core barrel means having driving piston means secured to one end thereof;
   said driving piston means and said core barrel means being axially reciprocable within said bore means; and
   the other end of said core barrel means being adapted to penetrate said earth formation and cut a core sample therefrom.

8. The apparatus of claim 7 wherein said retraction means includes a piston shaft slidable within said driving piston means,
   said piston shaft having coring piston means at its lower end adapted to operatively engage the upper end of said coring barrel means when said core barrel means is in its retracted position;
   said driving piston means including an axial inner cylindrical collet piston portion;
   a collet piston disposed within said piston portion;
   resilient flex collet means adapted to grip resiliently said shaft disposed within said piston portion and above said collet piston;
   said shaft being slidable within both said collet piston and said collet means, and
   core barrel retraction means operatively engaging said collet piston and adapted to force said collet piston upwardly against said collet means until said collet means resiliently grips said shaft and thereby retracts said core barrel means.

9. The apparatus of claim 7 wheren said housing means includes coring holder gate means adapted to contain a core sample extracted from said formation within said core means after said core-cutting means is retracted from said earth formation.

10. The apparatus of claim 5 including instrument housing means operatively engaging said core-cutting means for retaining therein a measuring instrument;

motive means coupled to both said instrument housing means and said core-cutting means and adapted to align said instrument housing means with the portion of the earth formation from which a core sample has been removed after the core-cutting means is retracted therefrom;

extensible means cooperating with said instrument housing means adapted to extend into said portion of the earth formation; and retraction means cooperating with said instrument housing means for retracting said instrument housing means from said portion of the earth formation.

References Cited

UNITED STATES PATENTS

| | | | |
|---|---|---|---|
| 2,665,885 | 1/1954 | Gignoux | 175—6 |
| 3,098,533 | 7/1963 | Ostrom | 175—6 |
| 3,163,241 | 12/1964 | Daigle et al. | 175—20 |
| 3,345,879 | 10/1967 | Nasu et al. | 175—6 |
| 3,392,794 | 7/1968 | Kurillo et al. | 175—6 |

JAMES A. LEPPINK, *Primary Examiner.*

U.S. Cl. X.R.

175—20, 58, 94